June 13, 1950  O. M. SUMMERS  2,511,383
CASSETTE
Filed Aug. 6, 1945  3 Sheets-Sheet 1
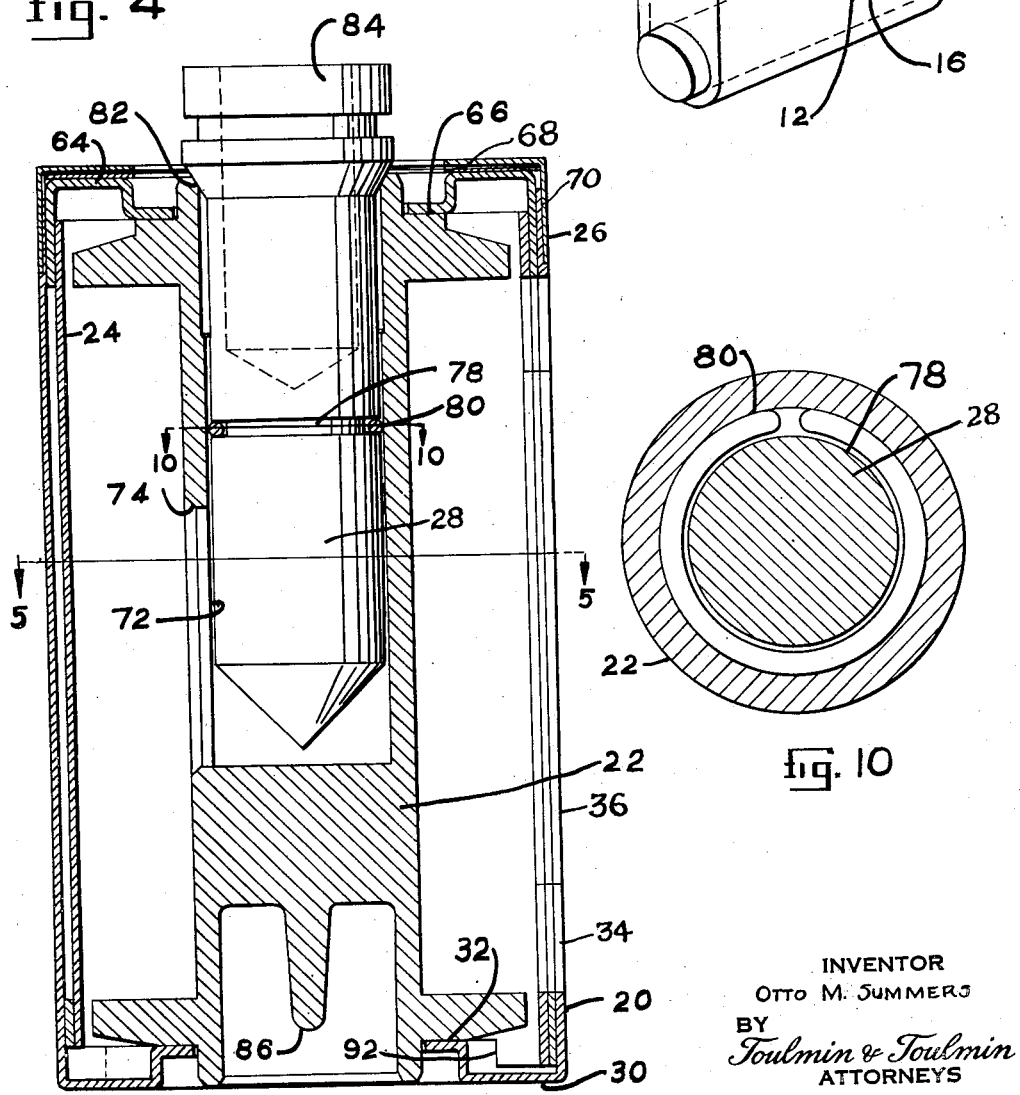
INVENTOR
OTTO M. SUMMERS
BY
Toulmin & Toulmin
ATTORNEYS June 13, 1950 O. M. SUMMERS 2,511,383
CASSETTE
Filed Aug. 6, 1945 3 Sheets-Sheet 2
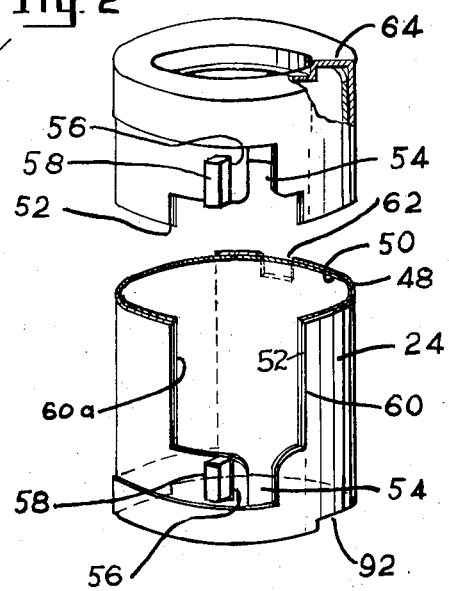
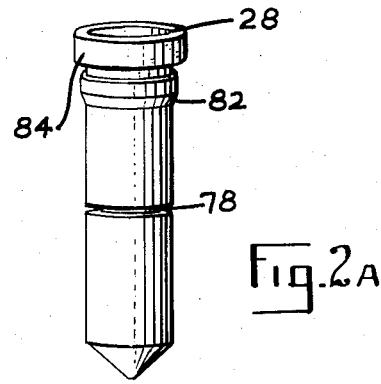
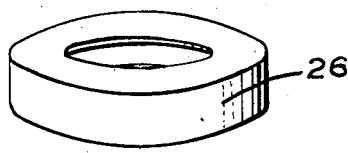
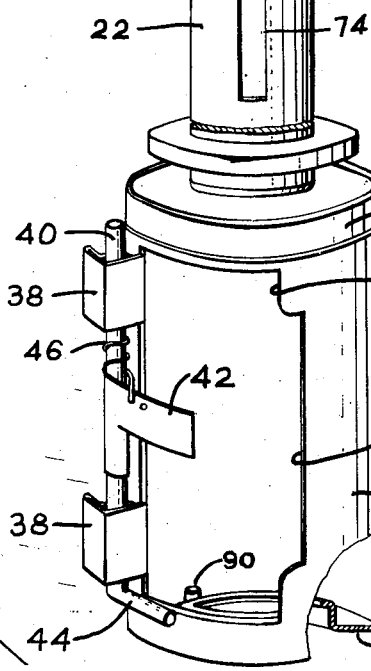
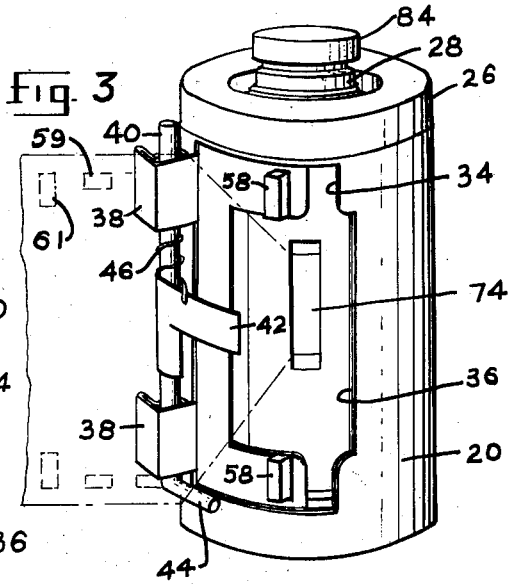
INVENTOR
OTTO M. SUMMERS
BY
Toulmin & Toulmin
ATTORNEYS

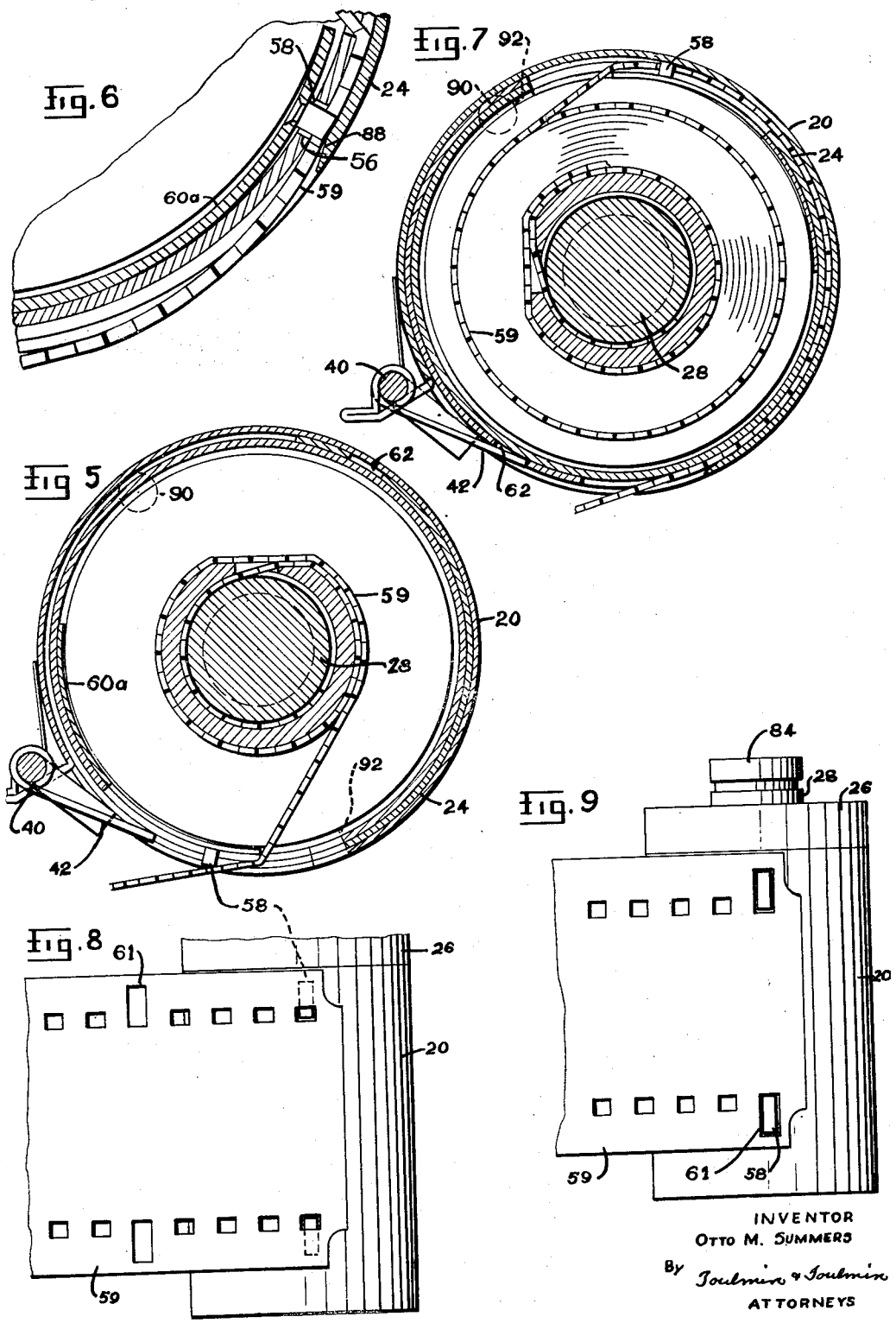

Patented June 13, 1950

2,511,383

UNITED STATES PATENT OFFICE 2,511,383

CASSETTE

Otto M. Summers, Abington, Pa., assignor to The W. W. Boes Company, Dayton, Ohio, a corporation of Ohio Application August 6, 1945, Serial No. 609,126

16 Claims. (Cl. 254—71)

This invention relates to photographic equipment and, particularly, to cassettes adapted for holding lengths of film.

The object of this invention is to provide an improved cassette for receiving long strips of film and excluding light from the said film.

Another object is to provide an improved cassette construction which is locked in its closed position so that there is no chance of the film within the cassette being accidentally exposed to the light.

Still another object is to provide a cassette having means operated by the film for opening and closing the cassette.

Still another object of this invention is to provide a cassette comprising telescoping tubular members which are sealed together and which have openings adapted to register to permit the film to be introduced or to be removed from the cassette or to be moved out of register in order to seal off the film within the cassette from light.

Another object is to provide a film magazine or cassette which is so arranged that the emulsion portion of the film which is to receive an image is prevented from coming in contact with any portion of the mechanism which would cause scratches in the film coating.

These and other objects and advantages will become more apparent upon reference to the accompanying drawings in which:

Figure 1 is a perspective view of a camera showing the location therein of the film magazine or cassette of this invention;

Figure 2 is a disassembled perspective view of a part of the magazine or cassette of this invention;

Figure 2—A is a view like Figure 2 and showing the remainder of the magazine.

Figure 3 is an assembled perspective view of the cassette;

Figure 4 is a vertical section through the cassette in the plane of the film receiving aperture thereof;

Figure 5 is a plan section taken substantially on the line 5—5 of Figure 4 showing the cassette in its opened position;

Figure 6 is a fragmentary view showing the cassette as it is being closed;

Figure 7 is a view similar to Figure 5 but showing the cassette completely closed;

Figure 8 is an elevational view showing the film passing into the cassette during the winding operation;

Figure 9 shows the film at the start of the closing operation of the cassette; and Figure 10 is a plan section taken substantially along the line 10—10 of Figure 4.

Referring to Figure 1, there is shown a camera 10 having a lens system at 12 adapted for throwing an image on the film indicated at 14 which is unrolled from a holder or magazine at 16 onto a second holder at 18.

The magazines are ordinarily called cassettes and are adapted for receiving several frames of film as a continuous strip and for excluding light from the said film until it is placed in a camera. Then the cassette is opened and the film is threaded through the camera to be withdrawn therefrom after the camera is closed and operated.

The construction of the cassettes of this invention is more particularly shown in Figures 2, 3 and 4 wherein it will be seen that there is an outer shell generally indicated at 20, a spool generally indicated at 22, an inner shell or barrier generally indicated at 24, a closure cap 26 and a pin 28 for locking the film to the spool.

The outer shell 20 comprises a tubular member having an inwardly turned flange as at 30 at the lower end thereof on which the spool 22 sets as at 32, this providing a light excluding joint for protection of the film.

The wall of the shell 20 is apertured at 34, the aperture having an undercut portion 36 therein so that the film which enters or leaves the cassette touches only at the edges of the aperture 34 while the center or coated part passes over the undercut 36. On the side of the aperture 34 opposite the undercut 36 there is a pair of outwardly turned ears 38 which form apertures for receiving a rod 40 which carries a latch plate 42 and which has a bent end 44. A spring 46 continuously urges the rod 40 to move the latch plate 42 into the aperture 34.

The ears 38 also operate as lugs to cooperate with a fixed member when the cassette is being filled to retain the outer shell stationary.

The inner shell or barrier at 24 comprises an outer portion 48 and an inner portion 50 which are suitably permanently secured together when assembled as by welding, soldering, brazing, etc. The inner part 50 consists of a cylindrical member having an aperture 52 therein which has the adjacent notches 54 and 56 at opposite ends thereof. The notches 54 are for the purpose of receiving the edge of the film which passes to the inside of the inner shell to be wound on the spool 22. The notches 56 are for the purpose of receiving a pair of lugs 58 which are carried on a spring plate 60a which is secured to the inside of the cylinder 50. The lugs 58 lie in the path of the sprocket holes to be found in the usual type film and are of the same length, in the direction of the film, as the sprocket holes but are of greater width transversely of the film.

In the film contemplated for use in connection with this cassette a pair of opposite sprocket holes at the end of a predetermined number of frames of film will be punched out to a size which will receive the lugs 58 so that as the film is wound into the cassette, these enlarged sprocket holes engage the lugs 58 at the proper time to turn the inner shell 24 within the outer shell 20 automatically to close the cassette, the outer shell being held at this time by the engagement of its lugs 38 with a fixed abutment.

The outer portion 48 of the inner shell assembly consists of a cylinder having an aperture 60 therein adapted to register along one edge with the aperture 52 in the cylinder 50 but to extend beyond the other edge of the aperture 52 so that the said aperture 60 extends through about 212° of arc. Adjacent the last mentioned edge of the aperture 60 is a cutout 62 in the sleeve 48 which is on the same level when the cassette is assembled as the latch plate 42 and which is adapted for registration with the latch plate 42 when the cassette is closed.

The upper end of the sleeve 48 is flanged inwardly as at 64 to a shape similar to that of the flange 30 of the outer shell assembly. The flange 64 engages the spool at 66 to form a light excluding seal at the upper end of the said spool.

A spring plate 68 is adapted to rest on the flange 64 to force the inner shell assembly downwardly against the spool and the spool downwardly against the flange 30. The spring 68 is held in place by the cap 26 which is received in an undercut 70 on the outer shell assembly. When the spool is placed within the outer shell, the inner shell is put in place, the spring plate 68 is placed on top of the inner shell, and the cap 26 is placed over the undercut 70 and is retained in place by being machined to a press fit. Optionally, soldering or some other permanent method of attaching may be employed. The spring plate 68 also provides for a predetermined amount of friction for braking the spool and for retaining the shells in their respective positions.

The spool 22 comprises a central bore 72 and an opening 74 through which the end of a film may be inserted into the bore 72. Adapted to be closely received within the bore 72 is the plunger or pin 28 which is grooved at 78 for receiving a spring ring 80. The plunger 28 has a tapered portion adjacent the upper end as at 82 and a knurled knob at 84. In order to secure the end of a film to the spool, the plunger 28 is removed and the end of the film is passed through the opening 74 into the bore 72. The plunger is then replaced, the spring ring 80 serving to assist in retaining the plunger in place, and the tapered portion 82 serving to form a light excluding barrier.

In order to provide a means for rotating the spool for drawing film into the cassette the spool may comprise a key 86 at the lower end thereof which may be engaged by any suitable wrench.

The relative positions of the inner and outer shells immediately after receiving the end of a film is illustrated in Figures 5 and 8.

These views show the strip of film entering with the perforated edge in engagement with the lugs 58 and the end secured within the spool by the plunger 28. It will be noted that the usual sprocket holes 59 pass over the lugs 58, but that the holes 61 are large enough to receive the lugs.

By rotating the spool in a clockwise direction film is wound thereon until the holes 61 register with the lugs 58. When this occurs the lugs fall into the enlarged sprocket holes and the inner shell assembly commences to be driven by the film. In order for the lugs properly to engage the film they are formed to a greater length than will pass under the outer shell and are mounted on the aforementioned spring plate 60a. Then, in order to cause the lugs to pass under the outer shell there is provided at the edge of the aperture 36 a bevel 88 which will cam the lugs 58 downwardly as shown in Figure 6.

Continued rotation of the spool beyond its Figure 6 position causes the inner shell assembly to continue to rotate until it reaches its Figure 7 position. At this time the cutout 62 registers with the latch plate 42 and the spring 46 associated with the latter causes it to drop into locking engagement with the said cutout.

In order to limit rotation of the inner shell assembly to between its full open position and full closed position, the outer shell 20 has mounted in the flange 30 thereof a stop pin 90 which lies in the path of a notch 92 in the lower edge of the inner shell assembly. The notch 92 extends around the inner shell assembly through the amount of arc necesary to permit movement thereof from full open to full closed position.

Thus, when the cassette is closed to permit the latch plate 42 to fall into the cutout 62, the stop pin 90 also abuts the edge of the notch 92 so that the inner shell assembly 24 is positively locked in place relative to the outer shell.

It will be noted that when the cassette is in its closed and locked position the aperture 60 in the outer portion of the inner shell assembly provides a space between the inner shell assembly and outer shell within which the end of the film lies. Thus, there is no binding between the shells when they are moved from open to closed position or vice versa.

In order to unlock the inner shell to permit it to be opened when it is placed in a camera the bent end of the rod 40 may be turned to move the latch plate 42 out of the cutout 62 and the end of the film pulled. Optionally, the rod 40 together with the latch plate 42 may be moved axially to move the latch plate 42 away from the cutout 62 to release the inner shell assembly.

It will be seen that cassettes constructed according to this invention are perfectly light excluding when closed; are positively and automatically locked when moved into closed position; and when used with film punched according to this invention, and have closing, locking and opening means operated by the movement of the film to and from the cassette. Cassettes of the improved construction of this invention are relatively easy to manufacture and assemble and have long life. Likewise, the light barriers consisting of metal to metal contacts and tortuous passages are not subject to wearing out and failure as are light barriers consisting of fabric materials such as velvet.

It will be understood that various modifications and arrangements in structure could be made without departing from the spirit of my invention and, accordingly, I desire to comprehend such modifications and substitutions of equivalents as may be considered to come within the scope of the appended claims.

I claim:

1. In a film carrying cassette having a spool and a shell with a film receiving aperture enclosing said spool; a barrier movable across said aperture to exclude light from the inside of said cassette; and means for positively engaging said film and barrier whereby the movement of the film into said cassette moves said barrier into its light excluding position, said means being disengageable only when said barrier is returned to its aperture opening position.

2. In a film carrying cassette having a spool and a shell with a film receiving aperture enclosing said spool; a barrier movable across said aperture to exclude light from the inside of said cassette; means carried by the barrier adapted for positive engagement with said film for moving the barrier into its light excluding position by the movement of the film; and stop means for stopping said barrier in its closed position, said stop means also stopping movement of said film.

3. In a film carrying cassette having a spool and a shell with a film receiving aperture enclosing said spool; a barrier movable across said aperture to exclude light from the inside of said cassette; lug means carried by said barrier for engagement with marginal cut-outs in the film for operating the barrier by the movement of the film; and yielding means for urging said lugs against the film.

4. A film holding cassette comprising an outer shell, a barrier movably mounted within the outer shell, an aperture in said shell adapted for passing film; means operated by the film for moving said barrier across said aperture; and means for positively locking said barrier in its aperture closing position.

5. In a film carrying cassette; a spool; a shell within which said spool is rotatably mounted; an aperture in said shell for admitting film to and from said spool; a barrier movable to close said aperture, said aperture comprising a central notch whereby the film in its movement to or from said spool is engaged along the edge portion thereof only; means on said barrier responsive to the movement of the film to and from said cassette for operating said barrier.

6. In a film carrying cassette; a shell member having an aperture for receiving film; a barrier member movable within said shell for closing said aperture; cooperating abutment means on said members adapted to halt the same in one position with the aperture of the shell closed by the barrier and, in the other position, with the aperture open; latching means adapted automatically for latching said members in their aperture closing position; and means on said barrier for positively engaging the film carried by said casette and responsive to movements of said film to and from said cassette for actuating said barrier between its two operative positions.

7. In a film carrying cassette; a spool adapted for receiving film; telescoping sleeve means mounted about said spool; said sleeve means having apertures therein adapted selectively to be moved into registration for passing film or, to be moved out of registration for excluding light from said cassette; said apertures comprising a relieved central portion whereby the film is engaged by the edge thereof only during its passing; and lug means carried by one of said sleeve means adapted for relatively moving said sleeve means by said film during its movement.

8. In a film carrying cassette; an outer shell open at one end and having an inwardly extending flange on the other end; a film holding spool adapted for being inserted into said outer shell and for engaging said flange; an inner shell adapted for being closely received within said outer shell having one end open and the other end thereof inwardly flanged for engagement with the opposite end of said spool; film receiving apertures in said shells; cooperating abutment means carried by said shells for permitting relative rotation thereof between a position where said apertures register and a position where said apertures are out of register; cooperating latch means carried by said shells for positively retaining the same in said last mentioned position; and means operated by the film as it is drawn into said cassette for moving said shells into their latched position.

9. In a film carrying cassette; a spool for holding film; telescoping shells adapted for being rotatably mounted about said spool and for engaging the same on opposite ends in light excluding relationship; film receiving apertures in said shells adapted for being moved into light excluding relationship for completely closing said cassette or, into register for permitting film to be supplied to or taken from said spool; means operated by the film during its movement into or out of said cassette for accomplishing said movements; abutment means carried by said shells for stopping the same in said positions; and latch means selectively operable for positively retaining said shells in their cassette closing position or, for unlocking said shells to permit them to be moved into said aperture registering position.

10. In a film carrying cassette; a film holding spool; telescoping cylindrical shell means having their opposite ends flanged and adapted for rotatably receiving said spool between said flanged ends; yielding means continuously urging said flanges against the ends of said spool for excluding light from the interior of said cassette; apertures in said shells adapted for being moved into register to permt film to be transferred to and from said spool and, to be moved out of register for completely closing off said cassette; and means operated by the film as it is wound upon said spool or removed from said spool for automatically accomplishing said movements.

11. In a film carrying cassette; a spool; telescoping sleeves mounted about said spool having apertures therein adapted for registration to admit film to or from said spool, said sleeves being relatively rotatable for moving said apertures out of registration to exclude light from the interior of said cassette; the inner of said sleeves comprising lug means adapted for engagement with the film for moving said sleeves relatively from said aperture registering position to said light excluding position; and latch means selectively movable into effective or ineffective position for retaining said sleeves in said last mentioned position.

12. In a film carrying cassette; a spool adapted for receiving and holding the end of a film to be wound thereon; telescoping sleeves mounted about said spool; yielding means continuously urging said sleeves into braking and light excluding engagement with opposite ends of said spool; apertures in said sleeves adapted for registration to permit the supply of film to and from said spool; said sleeves being rotatable relatively to move said apertures into position to exclude light from the interior of said cassette;

lug means yieldably carried by the inner of said sleeves adapted for engagement with the edge portion of the film for bringing about the relative movement of said sleeves in both directions; and latch means automatically operable for locking said sleeves in their light excluding position and selectively movable into effective or ineffective position.

13. In a film carrying cassette; a spool; outer and inner shell members mounted about said spool and engaging the same in light excluding relationship on opposite ends thereof; apertures in said shells adapted to be moved into registration for admitting film to and from said spool and, to be moved out of registration for excluding light from the inside of the cassette, the inner of said shells comprising telescopically arranged cylindrical members, the inner of which comprises said aperture and the outer of which comprises a recess extending a substantial distance around said inner shell beyond said aperture; means operated by the movement of the film for moving the inner shell to close the cassette, the aforementioned recess providing a space for receiving the end of the film; and latch means comprising a recess in the outer member of said inner shell and a latch member on said outer shell adapted for engagement when the cassette is closed to retain the shells in their relative positions.

14. In combination with a cassette comprising a spool, and a shell member mounted about said spool having an aperture adapted for passing film; and a barrier member movable to close or open said aperture, and comprising lug means; strip film mounted on said spool and overlying said lug means and comprising aperture means adapted for engagement with said lug means for relatively moving said members in at least one direction as the film is drawn into or out from the cassette.

15. In combination with a cassette which comprises a shell having an aperture for passing film; a light barrier movable across said aperture for excluding light from the inside of said cassette, and comprising lug means extending into said aperture; strip film carried by said cassette and overlying said lug means and having aperture means of a size for receiving said lug means and located to engage the same to move said barrier into light excluding position as the film is drawn into the cassette.

16. In a film carrying cassette having a spool and a shell with a film receiving aperture enclosing said spool; a barrier movable across said aperture to exclude light from the inside of said cassette; means operated by the film for moving said barrier into its light excluding position; stop means for halting both said barrier and film when said barrier reaches its light excluding position; and releasable means carried by said barrier and shell and engageable for retaining said barrier in its light excluding position.

OTTO M. SUMMERS.

REFERENCES CITED

The following references are of record in the file of this patent:

UNITED STATES PATENTS

| Number | Name | Date |
|---|---|---|
| 1,223,332 | Akeley | Apr. 17, 1917 |
| 1,499,941 | Marette | July 1, 1924 |
| 1,642,935 | Mihalyi | Sept. 20, 1927 |
| 2,213,776 | Walter | Sept. 3, 1940 |

FOREIGN PATENTS

| Number | Country | Date |
|---|---|---|
| 161,626 | Great Britain | Apr. 11, 1921 |